US006396389B1

(12) United States Patent
Nakano et al.

(10) Patent No.: US 6,396,389 B1
(45) Date of Patent: May 28, 2002

(54) KEYLESS ENTRY CONTROL AND TRANSMITTER FOR THE SAME

(75) Inventors: Akio Nakano, Okazaki; Tooru Hagiwara, Toyoake; Hodaka Kamiya, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/148,418

(22) Filed: Sep. 4, 1998

(30) Foreign Application Priority Data

Sep. 5, 1997 (JP) ............................................ 9-241060

(51) Int. Cl.[7] ................................................ G06F 7/04
(52) U.S. Cl. ..................................... 340/5.72; 307/10.2
(58) Field of Search ....................... 340/825.31, 825.22, 340/825.34, 825.67, 825.72, 5.7, 5.71, 5.72, 5.23, 5.24; 307/9.1, 10.2; 380/21, 23, 42

(56) References Cited

U.S. PATENT DOCUMENTS

| | | | | |
|---|---|---|---|---|
| 4,890,108 A | | 12/1989 | Drori et al. | |
| 5,744,875 A | * | 4/1998 | Kleefeldt et al. | 307/10.2 |
| 5,774,065 A | * | 6/1998 | Mabuchi et al. | 340/825.72 |
| 5,955,981 A | * | 9/1999 | Rangan | 341/173 |

FOREIGN PATENT DOCUMENTS

| | | |
|---|---|---|
| DE | 195 30 724 A1 | 2/1997 |
| EP | 697491 A1 | 2/1996 |
| EP | 769 435 A2 | 4/1997 |
| JP | 5-275178 | 10/1993 |
| JP | 6-153274 | 5/1994 |

OTHER PUBLICATIONS

Patent Abstracts of Japan, vol. 096, No. 003, Mar. 29, 1996 & JP 07 303386 A Nov. 14, 1995.

* cited by examiner

*Primary Examiner*—Michael Horabik
*Assistant Examiner*—M. Shimizu
(74) *Attorney, Agent, or Firm*—Pillsbury Winthrop

(57) ABSTRACT

In the keyless entry control, if control switches are operated again while a transmission process specified by the control switch is being executed, function codes specified by states of operation of the control switch are stored by a transmitter. A remote control signal generated by converting the stored function code is transmitted after the completion of the preceding transmission process. If the control switch is operated twice to unlock all the doors of a vehicle, the doors other than that beside a driver's scat are unlocked by a transmission process corresponding to the second operation of the control switch after the door beside the driver's seat is unlocked in response to the first operation of the control switch.

10 Claims, 5 Drawing Sheets

KEYLESS ENTRY CONTROL AND TRANSMITTER FOR THE SAME

CROSS REFERENCE TO RELATED APPLICATION

This application relates to and incorporates herein by reference Japanese Patent Application No. 9-241060 filed on Sep. 5, 1997.

BACKGROUND OF THE INVENTION

1. Field of the Invention

The present invention relates to a keyless entry control, and more particularly to a keyless entry system for operating a door locking mechanism attached to a door of a vehicle or the like to lock and unlock the door locking mechanism through a wireless signal transmission and reception.

2. Description of Related Art

A known keyless entry system locks and unlocks a door locking mechanism included in a vehicle from a position at some distance from the vehicle by operating an actuator of the door locking mechanism by a wireless remote controller. When a control switch of a transmitter of the keyless entry system is operated, the transmitter transmits a radio wave signal.

Some keyless entry system operates to unlock only the door beside a driver's seat when a receiver receives a first unlocking signal, and unlocks also the doors other than the door beside the driver's seat if the receiver receives a second unlocking signal which is the same as the first unlocking signal in a predetermined time period, for example, within three seconds, after the reception of the first unlocking signal. A control switch of the transmitter for unlocking the door is operated once if it is desired to unlock only the door beside the driver's seat, and the same control switch is operated twice within, for example, three seconds if it is desired to unlock all the doors.

If the control switch of the transmitter is operated twice in a short time, it is likely that the control switch of the transmitter is operated for the second time while the transmitter is still carrying out a code transmission process in result of the operation of the control switch for the first time. In such a case, the transmitter interrupts the code transmission process started upon the operation of the control switch for the first time, and executes a code transmission process as a result of the operation of the control switch for the second time.

However, it is not appropriate to interrupt the code transmission process started in result of the first operation of the control switch when the two consecutive operations of the control switch signify particular control modes, and the code transmission process must be carried out for the two consecutive operations of the control switch. If the code transmission process for the first operation of the control switch is interrupted and the code transmission process for the second operation of the control switch is carried out, a control signal requesting a door unlocking operation is sent only once to the receiver and only the door beside the driver's seat is unlocked regardless of the control switch being operated twice, which is different from an operation intended by the operator and the operator may possibly decide that the keyless entry system is malfunctioning.

The same problem arises even if the two consecutive operations of the control switch do not signify any particular control mode and signify an unlocking operation and a subsequent trunk opening operation. When the operator operates the control switch twice, the operator expects the execution of two separate operations. However, if execution of a code transmission process in result of the first operation of the control switch is interrupted and a code transmission process is executed in result of the second operation, only the trunk opening operation is carried out and the door unlocking operation will not be carried out, which makes the operator think that the keyless entry system is malfunctioning.

SUMMARY OF THE INVENTION

It is an object of the present invention to surely carry out code transmission processes specified by operating a control switch a plurality of times even if the control switch is operated a plurality of times within a short time.

According to the present invention, a transmitting unit converts a keyless entry device specified by the state of operation of the control switch and a function code expressing the contents of a specified operation into a remote control signal of a radio wave and transmits the remote control signal. A transmission control unit carries out the following transmission control operation. If the control switch is operated while the transmitting unit is engaged in a code transmission process, the state of operation of the control switch relating to the code transmission process being executed or the function code specified by the state of operation is stored, and the transmitting unit converts a function code specified by the stored data on the state of operation or the stored function code into a remote control signal and transmits the remote control signal after accomplishing the preceding code transmission process.

If the control switch is operated twice within a short time after the first time, the transmitter stores data on a state of operation or a function code specified by the state of operation if the control switch is operated while the code transmission process is being executed. It transmits the function code specified by the state of operation after accomplishing the preceding code transmission process. For example, when the operator operates the control switch twice with an intention to unlock all the doors of a vehicle, the door beside the operator's seat is unlocked in result of the first operation of the control switch and, subsequently, a code transmission process is executed for the second operation of the control switch to unlock the rest of the doors.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENTS

A preferred embodiment of the present invention will be described hereinafter with reference to a keyless entry control for an automotive vehicle.

Figure 1:
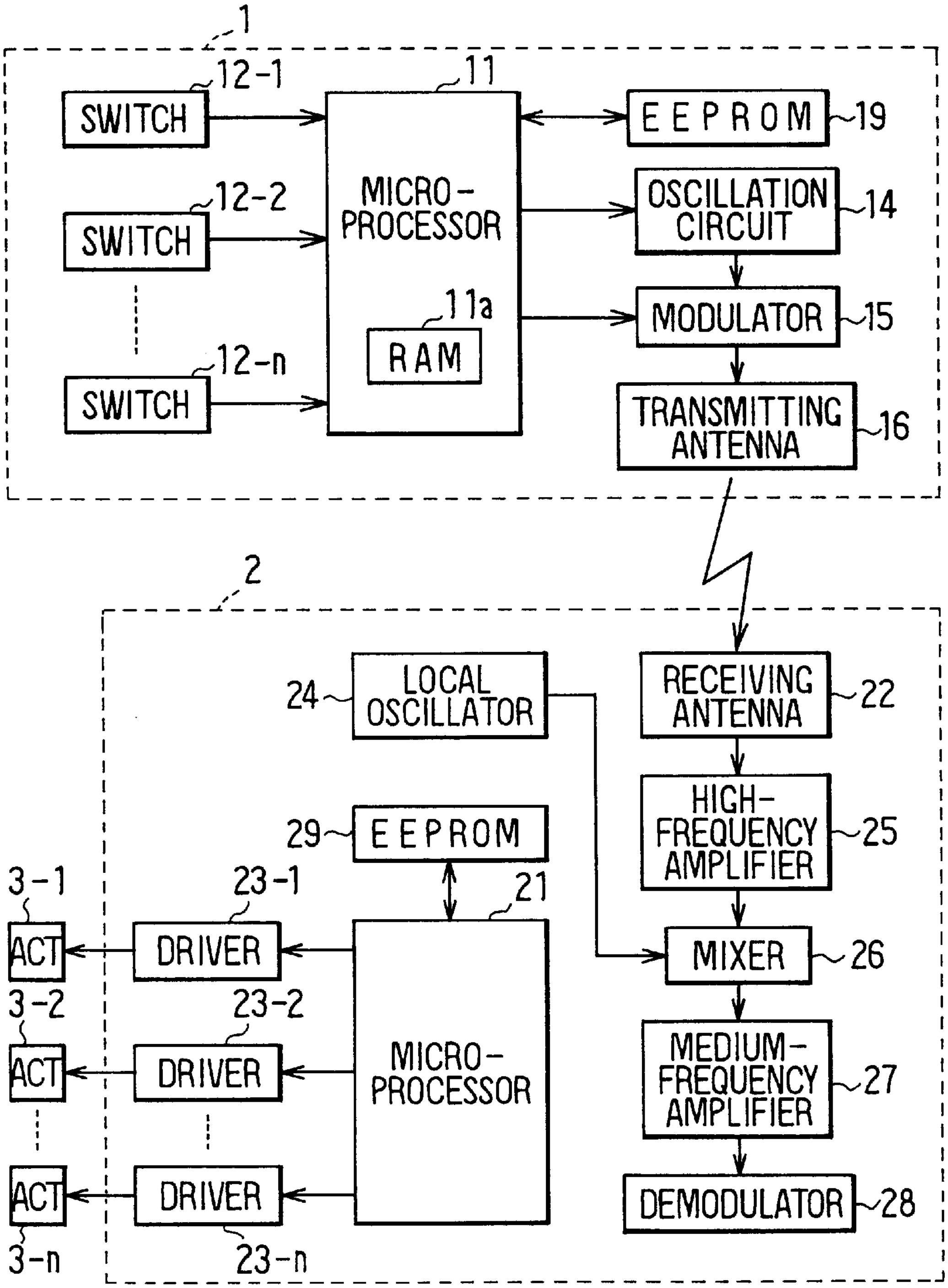
FIG. 1 is a block diagram of a keyless entry system of the present invention as applied to a wireless control system for controlling devices installed in a vehicle.

A keyless entry system comprises, as shown in FIG. 1, a transmitter 1, and a receiver 2 installed on the vehicle to receive radio wave control signals from the transmitter 1 and to drive and control devices installed on the vehicle. The receiver 2 executes control operations, for example, to give a locking or unlocking drive signal to a door locking motor installed on a door, and to give an opening drive signal to a trunk opening motor installed on a trunk.

The transmitter 1 may be contained in a master key to be used for starting the engine of the vehicle and for locking and unlocking the doors of the vehicle or may be an individual transmitter. The transmitter 1 comprises a microprocessor 11, i.e., a control unit for controlling all the operations of the transmitter 1, control switches 12-1, 12-2, . . . and 12-*n*, an oscillation circuit 14, a modulator 15, a transmitting antenna 16, and an EEPROM 19, i.e., a memory (storage) unit.

The control switches 12-1, 12-2, . . . and 12-*n* are used for specifying different functions, such as a door locking function, a door unlocking function, a trunk opening function, a seat position setting function and such, respectively, in a remote control mode. Signals indicating the operation of the control switches 12-1, 12-2, . . . and 12-*n* are applied to the microprocessor 11.

An ID code identifying the transmitter 1 is stored in an EEPROM 19 connected to the microprocessor 11. A rolling code, the contents of information expressed by which changes every time the rolling code is transmitted, and information for generating a transmission code are stored in a DRAM 11*a*, i.e., an internal memory unit, included in the microprocessor 11. The microprocessor 11 decides which one of the control switches 12-1, 12-2, . . . and 12-*n* is operated, and generates a transmission code including a function code expressing a function assigned to the operated control switch.

The oscillation circuit 14 and the modulator 15 are connected to the microprocessor 11. A transmission code generated by the microprocessor 11 is modulated to provide a modulated signal, and a weak radio wave corresponding to the modulated signal is radiated by the transmitting antenna 16.

The receiver 2 comprises a microprocessor 21, i.e., a control unit for controlling all the operations of the receiver 2, a receiving antenna 22, driving circuits 23-1, 23-2, . . . and 23-*n*, a local oscillator 24, a high-frequency amplifier 25, a mixer 26, a medium-frequency amplifier 27, a demodulator 28 and an EEPROM 29, i.e., a memory unit. The weak radio wave transmitted by the transmitter 1 is received by the receiving antenna 22, the radio wave is demodulated by a receiving demodulating unit comprising the local oscillator 24, the high-frequency amplifier 25, the mixer 26, the medium-frequency amplifier 27 and the demodulator 28 to provide a demodulated signal, the demodulated signal is converted into a corresponding digital signal, and the digital signal is applied to the microprocessor 21.

The microprocessor 21 executes a predetermined processing to generate an ID code and a rolling code on the basis of the demodulated signal. A code corresponding to the ID code identifying the transmitter 1 is stored in the EEPROM 29 connected to the microprocessor 21.

Actuators 3-1, 3-2, . . . and 3-*n* installed on the vehicle are connected to the driving circuits 23-1, 23-2, . . . and 23-*n* connected to the microprocessor 21. The driving circuits 23-1, 23-2, . . . and 23-*n* provide driving signals according to control signals given thereto to drive the actuators 3-1, 3-2, . . . and 3-*n*. If the actuator 3-1 is a door locking motor, the driving circuit 23-1 provides either a door locking signal for driving the actuator 3-1 for a door locking operation or a door unlocking signal for driving the actuator 3-1 for a door unlocking operation. In this embodiment, the control switches 12-1 and 12-2 of the transmitter 1 are used individually for providing a door locking signal and a door unlocking signal, respectively, in this embodiment because the controlled actuator installed on the door has a locking function and an unlocking function. The microprocessor 21 of the receiver 2 gives a control signal requesting a door locking operation or a door unlocking operation to the driving circuit 23-1, and the driving circuit 23-1 gives a driving signal for driving the actuator 3-1, i.e., the door locking motor, for either a door locking operation or a door unlocking operation.

Generally, only a door beside a driver's seat is unlocked if the receiver 2 receives a control signal including a door unlocking function, and doors other than the door beside the driver's seat are unlocked if a control signal including a door unlocking function is received again in a predetermined time, for example, in three seconds, after the reception of the first control signal. Therefore, the control switch 12-2 assigned for door unlocking operation of the transmitter is operated only once if it is desired to unlock only the door beside the driver's seat, the same control switch 12-2 is operated twice within, for example three seconds if it is desired to unlock all the doors of the vehicle.

However, if the control switch is operated twice within a short time, it is possible that the control switch is operated for the second time while a code transmission process started in result of the first operation of the control switch is being executed.

In this embodiment, code transmission processes corresponding to the operations of the control switches 12-1, 12-2, . . . and 12-*n* are surely executed even if the control switches 12-1, 12-2, . . . and 12-*n* are operated a plurality of times within a short time to avoid the foregoing undesirable operation.

Figure 2:
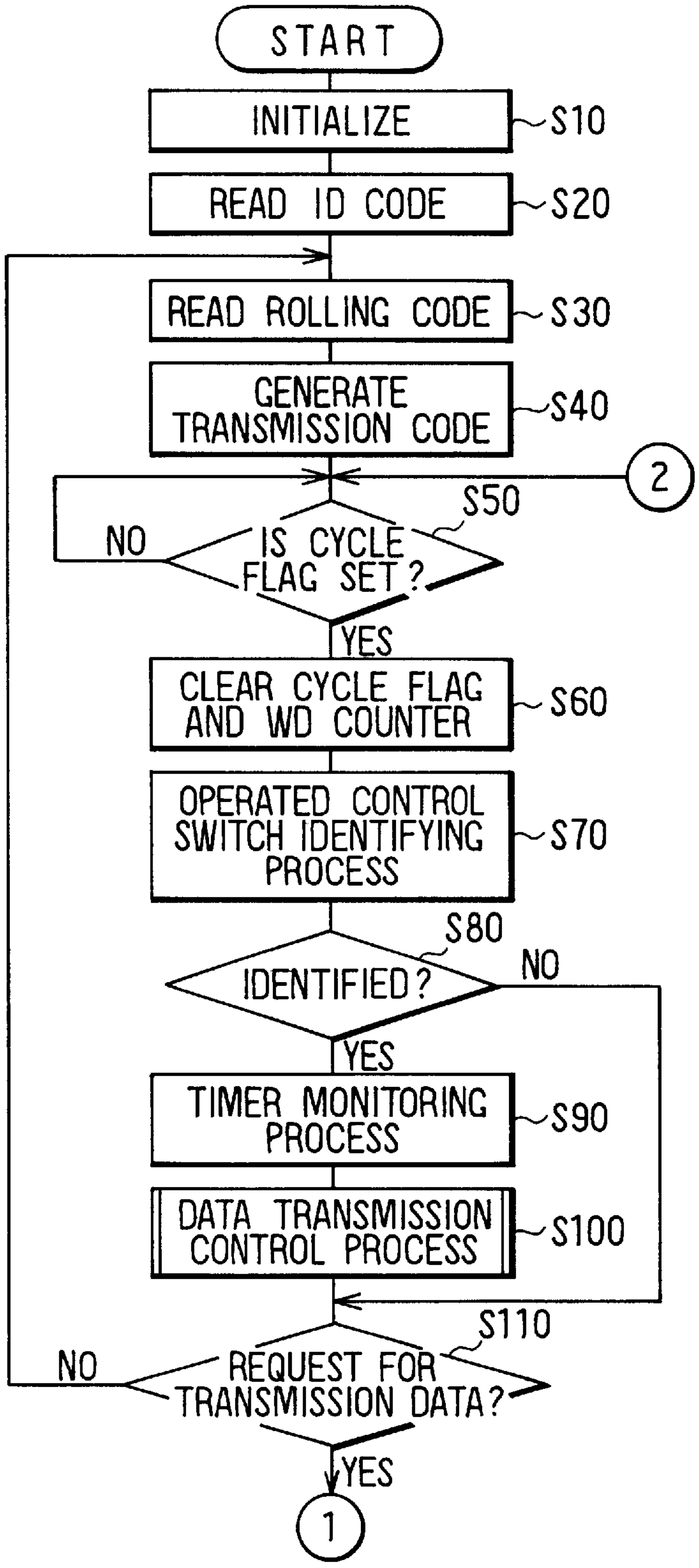
FIG. 2 is a flow chart of the first part of a main routine to be executed by a microprocessor in a transmitter.

The microprocessor 11 of the transmitter 1 is programmed to execute a main control routine shown in FIG. 2. The main control routine is started when any one of the control switches 12-1, 12-2, . . . and 12-*n* is operated.

An initializing process is executed in step S10, an ID code is read from the EEPROM 19 in step S20, a rolling code (ROL code) is read from the RAM 11*a* in step S30, and a transmission code is generated by using the ID code and the rolling code in step S40. The ID code is peculiar to the transmitter 1. If the ID code is stolen, a locking mechanism controlled by the transmitter 1 may be unlocked by an unauthorized user, which is undesirable from the viewpoint of security. Therefore, the ID code is enciphered by using a progressively changed rolling code obtained by progressively changing a rolling code according to the number of transmission cycles in a predetermined sequence.

A procedure for generating the transmission code may be performed as disclosed in EP-0697491 (U.S. application Ser. No. 08/510469, JP-A 8-102982), the details of which is incorporated herein by reference. That is, an exclusive OR operation is performed for the rolling code and the ID code, and the result of exclusive OR and the rolling code are rearranged on the basis of a predetermined order of arrangement. A format bits (start bit and stop bit), a function bit, a parity bit and a random number of predetermined bits are added to the rearranged code to generate a transmission code.

After the transmission data has been generated in step S40, a determination is made in step S50 to check if a cycle flag is set. Step S50 is repeated until the result in step S50 becomes affirmative (YES). If the result in step S50 is affirmative, step S60 is executed. The cycle flag is set in a subroutine shown in FIG. 6.

Figure 6:
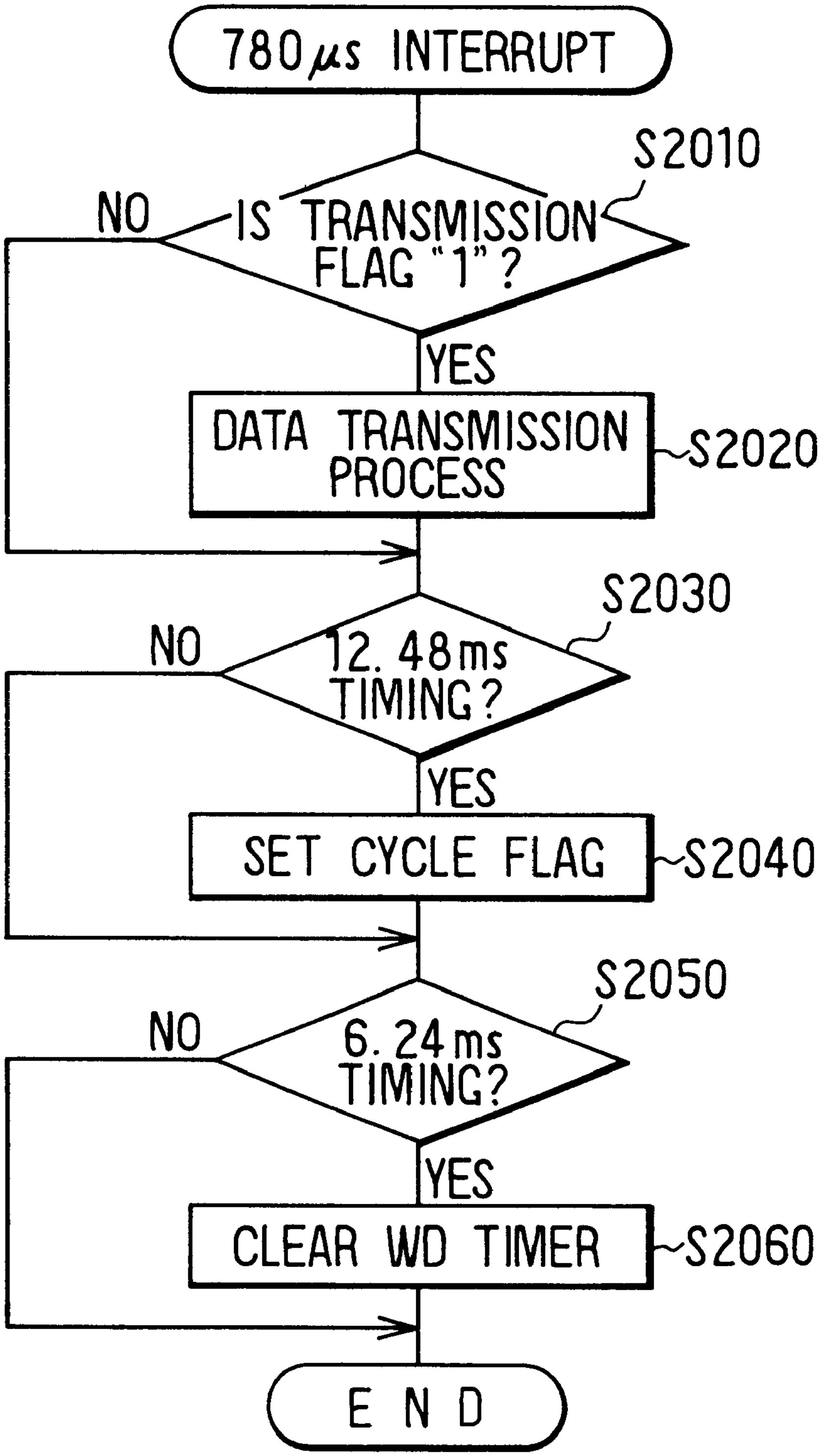
FIG. 6 is a flow chart of a subroutine to be executed by the microprocessor of the transmitter.

This interrupt subroutine shown in FIG. 6 is executed every 780 μs. When a transmission request flag is "1", i.e., the result of a determination made in step S2010 is affirmative, a data transmission process is executed in step S2020, and then the routine goes to step S2030. When the transmission request flag is not "1", i.e., the result of a determination made in step S2010 is negative (NO), step S2020 for the data transmission process is skipped and the routine goes to step S2030. If the cycle flag is set at a predetermined cycle of 12.48 ms, i.e., the result of a determination made in step S2030 is affirmative, the cycle flag is set in step S2040 and then the routine goes to step S2050. If the cycle flag is not set at the predetermined cycle of 12.48 ms, i.e., the result of a determination made in step S2030 is negative, step S2040 is skipped and the routine goes to step S2050. If the cycle flag is set at a predetermined cycle of 6.24 ms, i.e., the result of a determination made in step S2050 is affirmative, a WD timer is cleared in step S2060 and the subroutine is ended. If the cycle flag is not set at the predetermined cycle of 6.24 ms, i.e., the result of a determination made in step S2050 is negative, the subroutine is ended without clearing the WD timer.

If the cycle flag is set at the predetermined cycle of 12.48 ms (S2030, S2040) in the subroutine (FIG. 6) and the cycle flag is set, i.e., the result in step S50 of the main routine (FIG. 2) is affirmative, step S60 and the following steps are executed. Consequently, the step S60 and the following steps are executed every 12.48 ms, and the cycle flag is used for determining a main cycle.

In step S60, the cycle flag is cleared and the WD counter is cleared. If the count of the WD counter is not smaller than a fixed value, step S2060 for clearing the WD counter is not executed and the WD counter is reset.

Subsequently, instep S70, the operated control switch among the control switches 12-1.12-2, . . . and **12-*n* is identified. If the operated control switch is identified, i.e., if the result of a determination made in step S80 is affirmative, a timer monitoring process is executed in step S90, and then a data transmission control routine is executed in step S100**.

Figure 4:
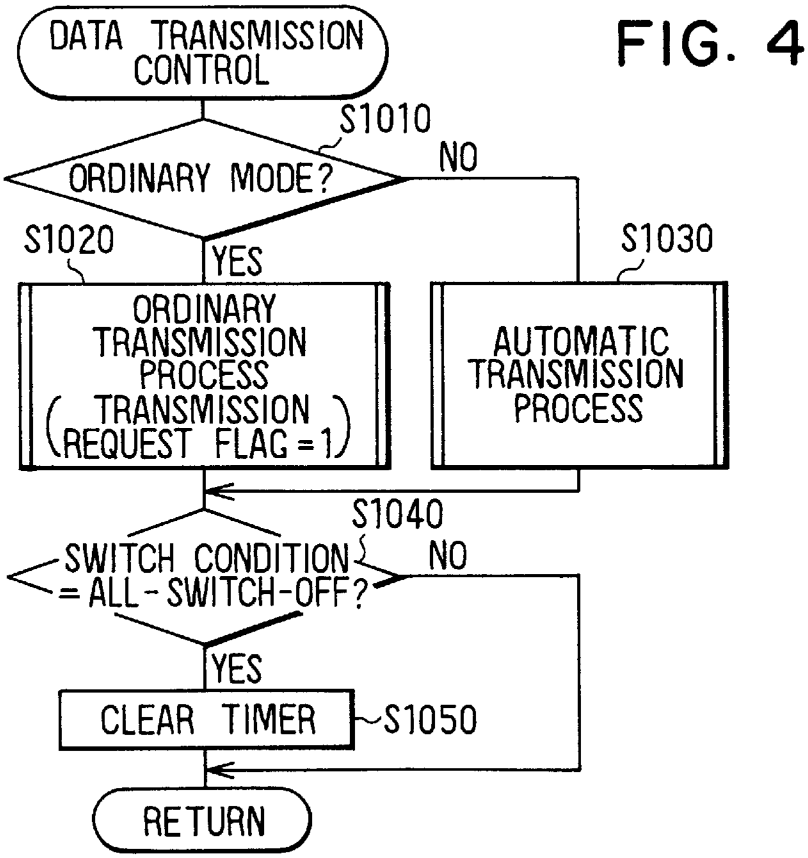
FIG. 4 is a flow chart of a data transmission control routine to be executed by the microprocessor of the transmitter.

In the data transmission control routine shown in FIG. 4 to be executed by step S100, a determination is made in step S1010 to check whether an ordinary transmission mode is selected or whether an automatic transmission mode is selected. If the ordinary transmission mode is selected, an ordinary transmission mode routine is executed in step S1020, and then the routine goes to step S1040. The transmission request flag is set to "1" during the ordinary transmission mode routine. If the automatic transmission mode is selected, an automatic transmission mode routine is executed in step S1030.

Figure 5:
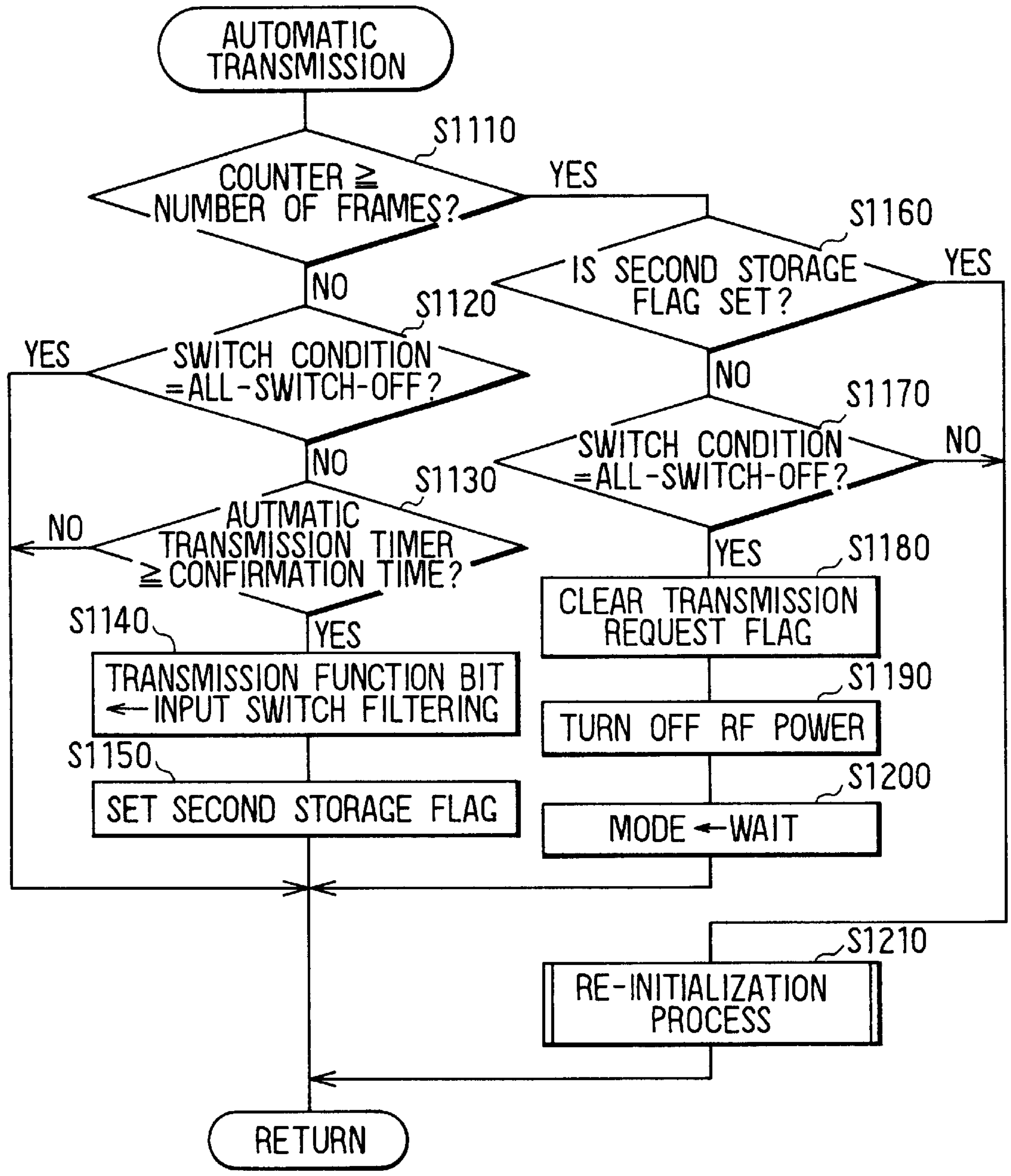
FIG. 5 is a flow chart of an automatic transmission mode routine to be executed by the microprocessor of the transmitter.

In the automatic transmission mode routine shown in FIG. 5 to be executed in step S1030, a determination is made in step S1110 to check if the count of a frame transmission counter is not smaller than the number of automatic transmission frames. The count of the frame transmission counter is incremented by one every time one frame is transmitted. If the count of the frame transmission counter is less than the number of automatic transmission frames, i.e., if all the frames to be transmitted have not been transmitted (the result of the determination made in step S1110 is negative), a determination is made in step S1120 to check if a switch condition after an input switch filtering process is an all-switch-off condition. The switch condition after an input switch filtering process is a switch condition after double coincidence sampling. If the result of the determination made in step S1120 is affirmative, the automatic transmission mode routine is ended, and the routine returns to step S1040 (FIG. 4).

If the switch condition after input switch filtering process is not the all-switch-off condition, i.e., the result of the determination made in step S1120 is negative, a determination is made in step S1130 to check if an automatic transmission timer is set for a time not shorter than an automatic transmission confirmation time. If the automatic transmission timer is set for a time not shorter than the automatic transmission confirmation time, i.e., if the result of the determination made in step S1130 is affirmative, a transmission function bit is set in the switch condition after the input switch filtering process in step S1140, the second memory flag is set in step S1150, and then the routine returns to step S1040 (FIG. 4). If the time for which the automatic transmission timer is less than the automatic transmission confirmation time, i.e., the result of the determination made in step S1130 is negative, the automatic transmission mode routine is ended and the routine returns to step S1040 (FIG. 4).

If the count of the frame transmission counter is not less than the number of automatic transmission frames, i.e., if all the frames to be transmitted have been transmitted (result of the determination made in step S1110 is affirmative), a determination is made in step S1160 to check if the second memory flag is set. If the result of the determination made in step S1160 is negative, a determination is made in step S1170 to check if the switch condition after input switch filtering process is the all-switch-off state. If the result of the determination made in step S1170 is negative, a re-initialization routine is executed in step S1210, the automatic transmission mode routine is ended and the routine returns to step S1040 (FIG. 4). The re-initialization routine of step S1210 sets a transmission data generation request flag. If the transmission data generation request flag is set, the result of the determination made in step S110 (FIG. 2) is affirmative.

If the switch condition after the input switch filtering process is the all-switch-off condition, i.e., the result of the determination made in step S1170 is affirmative, the transmission request flag is cleared in step S1180, an RF power supply is turned off in step S1190 and a wait mode is set in step S1200. Subsequently, the automatic transmission mode routine is ended and the routine returns to step S1040 (FIG. 4).

In step S1040 (FIG. 4), a determination is mad to check if the switch condition after the input switch filtering process is the all-switch-off condition. The automatic transmission timer is cleared in step S1050, the data transmission control routine is ended and the routine returns to step S110 (FIG. 2) if the result of the determination made in step S1040 is affirmative. The data transmission control routine is ended without executing step S1050 and the routine returns to step S110 (FIG. 2) if the result of the determination made in step S1040 is negative.

Figure 3:
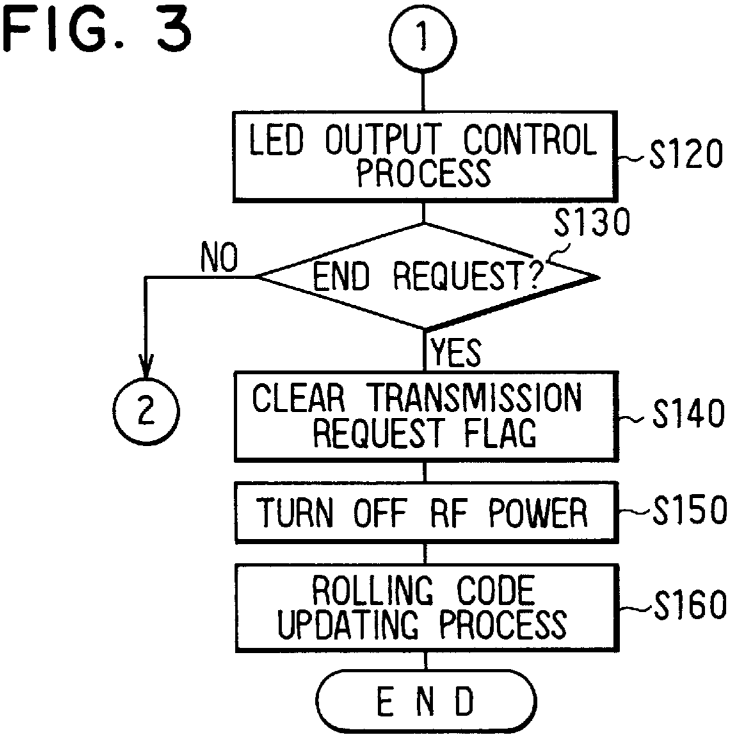
FIG. 3 is a flow chart of the second part of the main routine to be executed by the microprocessor in the transmitter.

A determination is made in step S110 (FIG. 2) to check if a transmission data generation is requested. The routine returns to step S30 if the result of the determination made in step S110 is affirmative. Step S120 (FIG. 3) is executed if the result of the determination made in step S110 is negative.

An LED output control process is executed in step S120 to notify the operator of acceptance of operation of one of the control switches 12-1, 12-2, . . . and 12-*n*.

A determination is made in step S130 to check if an end request is set. The end request is set when a predetermined stop migration condition is met. If the end request is not set, i.e., if the result of the determination made in step S130 is negative, step S50 (FIG. 2) and the following steps are repeated. The transmission request flag is cleared in step S140, the RF power supply is turned off in step S150, a rolling code updating process is executed in step S160 and the main routine is ended if the result of the determination made in step S130 is affirmative.

Steps of the procedures to be carried out by the microprocessor 11 of the transmitter 1 have been described in connection with the flowcharts shown in FIGS. 2 to 5. operations to be carried out when the door unlocking control switch 12-2 of the transmitter 1 is operated twice to open all the doors will be described in connection with the relevant principal processes shown in FIGS. 2 to 5.

The main routine (FIG. 2) is started and steps S10 to S40 are executed when the control switch 12-2 is operated once. In the subroutine shown in FIG. 6, the transmission request flag is not yet set, i.e., the result of the determination made in step S2010 is negative, the data transmission process is not executed in step S2020 and the routine goes to S2030. When the cycle flag is set at predetermined intervals of 12.48 ms (S2030, S2040), the result of the determination made in step S50 of the main routine is affirmative, and then steps S60 to S90 are executed, and the data transmission control routine of step S100 is executed.

In the data transmission control routine shown in FIG. 4 to be executed in step S100, it is decided in step S1010 that the ordinary transmission mode is selected, and the transmission request flag is set to "1" while the ordinary transmission mode process is being executed in step S1020. Consequently, in the subroutine shown in FIG. 6, the result of the determination made in step S2010 is affirmative, and the data transmission process is executed in step S2020. When the result of the determination made in step S1040 is affirmative, the automatic transmission timer is cleared in step S1050, and the routine returns to step S110 (FIG. 2). The result of the determination made in step S110 is negative, the LED output control process is executed in step S120 and, since the result of the determination made instep S130 is negative, step S50 and the following steps are repeated (FIG. 2). In the second cycle of the data transmission control process executed in step S100, it is decided that the automatic transmission mode is selected in step S1010 (FIG. 4) and the automatic transmission mode routine is executed in step S1030.

In the automatic transmission mode routine shown in FIG. 5 to be executed in step S1030, if all the frames to be transmitted have not been transmitted, i.e., the result of the determination made in step S1110 is negative, a determination is made in step S1120 to check if all the control switches after the input switch filtering process are in the OFF state. If the control switch 12-2 is not operated, all the control switches are in the OFF state, i.e., the result of the determination made in step S1120 is affirmative, the automatic transmission mode routine is ended and the routine returns to step S1040 (FIG. 4). If the control switch 12-2 is operated before all the frames to be transmitted are transmitted, not all the control switches are in t he OFF state, i.e., the result of the determination made in step S1120 is negative. Therefore, if the result of the determination made in step S1130 is affirmative, a signal entered by operating the control switch 12-2 for the second time is set as a function bit to be transmitted in the second transmission cycle, and the second memory flag is set in step S1150.

Then, the routine returns to step S1040 (FIG. 4). Since the result of the determination made in step S1040 is negative, the automatic transmission timer clearing process of step S1050 is not executed and the routine returns to step S110. since the result of the determination made in step S110 is negative, the LED output control process is executed in step S120. Since the result of the determination made in step S130 is negative, the routine returns to step S50 and the data transmission control routine is executed again in step S100.

In the automatic transmission mode routine of FIG. 5, when the control switch is operated for the second time while the data transmission process is being executed in step S2020 (FIG. 6) in result of the first operation of the control switch, a transmission function bit corresponding to the second operation is set in step S1140, the second memory flag is set in step S1150. Therefore, the result of the determination made in step S1110 becomes affirmative upon the completion of the first data transmission cycle and the step S1160 is executed. Since the second memory flag is set, the re-initialization routine is executed in step S1210.

The result of the determination made subsequently in step S1040 is affirmative, the automatic transmission timer is cleared in step S1050, and then the routine returns to step S110 (FIG. 2). Since a transmission data generation request is set by the re-initialization routine in step S1210, the result of the determination made in step S110 is affirmative and then steps S30 to S90 are executed to transmit data in result of the second operation of the control switch. In the data transmission control routine to be executed in step S100 shown in FIG. 4, it is decided in step S1010 that the automatic transmission mode is selected, and the automatic transmission mode routine is executed in step S1030. In the automatic transmission routine shown in FIG. 5, if all the frames to be transmitted have not been transmitted, i.e., the result of the determination made in step S1110 is negative, a determination is made in step S1120 to check if the switch condition after the input switch filtering process is the all-switch-off condition. Since the control switch 12-2 is not operated, the switch condition after the input switch filtering process is the all-switch-off condition, i.e., the result of the determination made in step S1120 is affirmative, the automatic transmission mode routine is ended and the routine returns to step S1040 (FIG. 4). The result of the determination made in step S1040 is affirmative, and the automatic transmission timer is cleared in step S1050. Upon the completion of data transmission for the second operation of the control switch, i.e., the result of the determination made in step S1110 is affirmative, step S1160 is executed. Since the second memory flag is not set, i.e., the result of the determination made in step S1160 is negative, step S1170 is executed.

Since the switch condition after the input switch filtering process is the all-switch-off condition, i.e., the result of the determination made in step S1170 is affirmative, the transmission request flag is cleared in step S1180, the RF power supply is turned off in step S1190, and the wait mode is set in step S1200. The automatic transmission mode routine is ended, the routine returns to the subroutine shown in FIG. 4, the subroutine shown in FIG. 4 is ended, and then step S110 (FIG. 2) and the following steps are executed. Since the predetermined stop migration condition is met, the result of the determination made in step S130 (FIG. 3) is affirmative, the transmission request flag is cleared in step S140, the RF power supply is turned off in step S150, the rolling code updating process is executed in step S160 and the main routine is ended.

In the keyless entry system in this embodiment, it is necessary only to operate the door unlocking control switch 12-2 of the transmitter once if it is desired to open only the door beside the driver's seat, and it is necessary only to operate the same door unlocking control switch 12-2 of the transmitter 1 twice within, for example, three seconds if it is desired to unlock all the doors. Although the control switch is operated for the second time while the code transmission process is being executed in result of the first operation of the same control switch if the control switch is operated twice within the short time, the code transmission process corresponding to the second operation of the control switch can surely be executed after the code transmission process corresponding to the first operation of the control switch has been completed.

As described above, the transmitter 1 is capable of surely executing the code transmission process corresponding to the second operation of the control switch after the completion of the code transmission process corresponding to the first operation of the control switch even if the control switch is operated for the second time while the code transmission process corresponding to the first operation of the control switch is being executed; that is, if the operator operates the control switch 12-2 twice with an intention to unlock all the doors, the door beside the driver's seat is unlocked by the transmission process corresponding to the first operation of the control switch and the rest of the doors are unlocked by the transmission process corresponding to the second operation of the control switch, which conforms the intention of the operator.

In the above embodiment, the function codes specified by the states of operation of the control switches 12-1, 12-2, . . . and 12-*n* are stored if the control switches 12-1, 12-2, . . . and 12-*n* are operated for the second time during transmission processes corresponding to the first operation of the control switches 12-1, 12-2, . . . and 12-*n*. The states of operation indicating which of control switches 12-1, 12-2, and 12-*n* are operated may be stored, function codes may be specified on the basis of the stored states of operation after the completion of the preceding transmission process, and remote control signals obtained by converting the function codes thus specified may be transmitted.

The keyless entry system operates in the same mode, for example, when the control switches are operated to unlock the door and to unlock the trunk instead of signifying an operation to unlock the door beside the driver's seat by the one operation of the control switch and an operation to unlock all the doors by the two operations of the same control switch. The operator expecting that both the operations specified by operating the control switch twice be achieved will consider that the keyless entry system is malfunctioning if the trunk is opened and the door is not unlocked. Therefore, it is effective to carry out the transmission processes corresponding to the two operations of the control switches.

The keyless entry system operates in the same mode when the control switch is operated three or more times. When the control switch is operated for the second and the third time while a transmission process corresponding to the first operation of the control switch, states of the second and the third operation of the control switch or function codes specified by the states of the second and the third operation of the control switch may be stored, a transmission process corresponding to the second operation of the control switch may be executed after the completion of the transmission process corresponding to the first operation of the control switch, and transmission corresponding to the second operation of the control switch may be executed.

If the control switches 12-1, 12-2, . . . and 12-*n* are operated a plurality of times, a state of the last operation or a function code specified by the state of the second operation may be stored.

In the foregoing embodiment, the receiver 2 is provided with the driving circuits 23-1, 23-2, . . . and 23-*n*, to give driving signals to the actuators 3-1, 3-2, . . . and 3-*n* on the basis of function codes determined by analyzing the received remote control signals. The receiver may only analyze the function codes and such, and the function codes may be received by an additional body ECU installed in the vehicle, and driving signals may be given to the actuators 3-1, 3-2, . . . and 3-*n* by an ECU (electronic control unit) mounted in a vehicle.

The present invention is not limited to the foregoing embodiment and modifications specifically described herein and may be implemented in many other ways without departing from the scope of the invention.

We claim:

1. A keyless entry control system having an entry device, comprising:

a control switch for selecting functions to be carried out by the entry device;

a transmitting unit for converting a function code indicative of the entry device and an operation to be carried out by the entry device specified by operating the control switch into a remote control signal of a radio wave, and for sending out the control radio wave signal; and a transmission control unit for storing data on a state of operation of the control switch being carried out for a code transmission process or the function code specified by the state of operation of the control switch operated to cause a signal transmission process is operated again while the transmitting unit is engaged in the signal transmission process, for converting the function code specified by the stored data on the state of operation or the stored function code into a corresponding remote control signal of a radio wave, and causing the transmission unit to send out the remote control signal after a previous transmission is completed.

2. The system according to claim 1, wherein:

the transmission control unit stores data on a state of a last switch operation or a function code specified by the last switch operation, if the control switch is operated a plurality of times while the transmitting unit is engaged in the transmission process.

3. The system according to claim 1, wherein:

the transmission control unit determines the operation of the control switch to be improper if the duration of operation of the control switch is less than a predetermined lower limit, and disables the operation to be used for specifying the function code to be transmitted by the transmitting unit.

4. The system according to claim 1, further comprising:

a receiver installed on a vehicle to receive the remote control signal and control the entry device installed on the vehicle.

5. The system according to claim 1, further comprising:

a receiver for receiving the remote control signal and for controlling the entry device to attain the operation specified by the remote control signal.

6. The system according to claim 5, wherein:

the entry device has a plurality of door unlocking functions to unlock a plurality of doors of a vehicle which can be specified by operating the control switch; and the receiver unlocks only a door beside a driver's seat in response to the remote control signal corresponding to the function code indicative of the door unlocking function, and unlocks other doors beside seats other than the driver's seat in response to another remote control signal corresponding to the function code indicative of the same door unlocking function within a predetermined time period after the reception of a previous one of the remote control signal.

7. The system according to claim 5, wherein:

the remote control signal includes an ID code specific to a user in addition to the function code; and the receiver analyzes the remote control signal to check if the ID code coincides with an ID code previously stored therein, and operates the entry device for an operation specified by the function code included in the remote control signal only when the ID code coincides with the ID code previously stored therein.

8. A keyless entry control method comprising:

operating a switch of a transmitter to instruct a first predetermined operation of a plurality of actuators;

transmitting a first remote control signal indicative of the first predetermined operation of the actuators from the transmitter to a receiver;

checking whether the switch is operated again for a second predetermined operation of the actuators while the transmitter is in a signal transmission operation for the first predetermined operation of the actuators;

storing in the transmitter another operation of the switch for the second predetermined operation of the actuators, if the another operation is within a predetermined time period corresponding to the transmission operation of the transmitter;

transmitting, after a completion of the signal transmission operation of the first remote control signal, a second remote control signal indicative of the second predetermined operation of the actuators from the transmitter to the receiver in response to the stored another operation of the switch; and driving the actuators by the receiver in response to the received first remote control signal and the second remote control signal to perform the first predetermined operation and the second predetermined operation of the actuators, respectively.

9. The control method according to claim 8, wherein:

the first predetermined operation of the actuators is an unlocking of a door of a vehicle beside a driver's seat; and the second predetermined operation of the actuators is an unlocking of other doors of the vehicle.

10. The control method according to claim 8, wherein:

the number of operation of the switch is set different between the first predetermined operation and the second predetermined operation.

* * * * *